*M. Killacky,*
*Combined Horse Collar and Hame.*
No. 46,606. Patented Feb. 28, 1865.
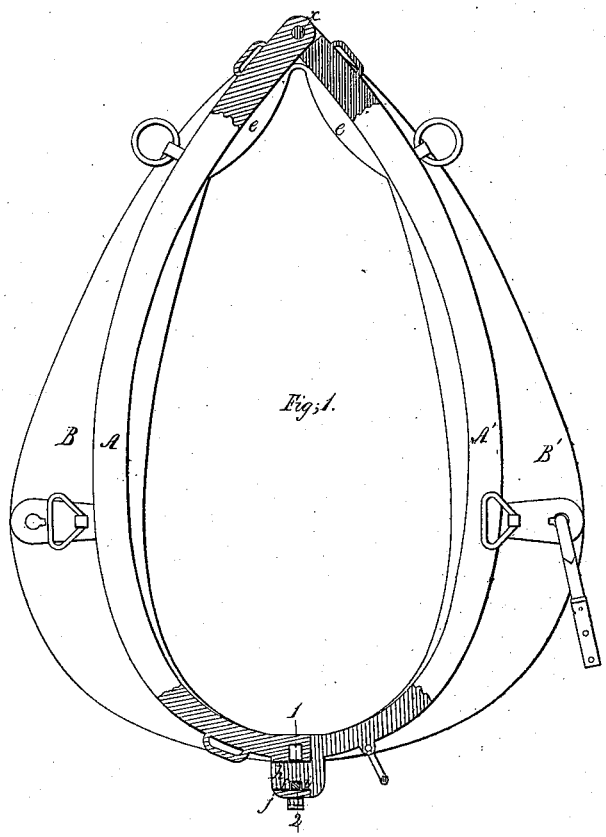
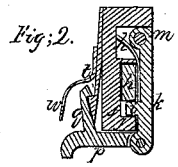
Witnesses.
Inventor.
M. Killacky
by his Attorney
Henry Howson

UNITED STATES PATENT OFFICE.

MARTIN KILLACKY, OF PHILADELPHIA, PENNSYLVANIA, ASSIGNOR TO HIMSELF AND J. G. ROUSE, OF SAME PLACE.

IMPROVED HORSE-COLLAR AND HAMES.

Specification forming part of Letters Patent No. 46,606, dated February 28, 1865.

*To all whom it may concern:*

Be it known that I, MARTIN KILLACKY, of Philadelphia, Pennsylvania, have invented a Combined Horse-Collar and Hames; and I do hereby declare the following to be a full, clear, and exact description of the same, reference being had to the accompanying drawings, and to the letters of reference marked thereon.

My invention consists of a horse-collar and hames combined, hinged together at the top and connected together at the bottom by means of a locking device, all substantially as described hereinafter, so that when disconnected at the lower end the hames and collar may be opened and readily placed over the horse's neck without the necessity of resorting to the tedious manipulation, and without incurring the delay demanded in adjusting these portions of harness as usually constructed.

In order to enable others skilled in the art to make and apply my invention, I will now proceed to described the manner of constructing and using the same.

On reference to the accompanying drawings, which form a part of this specification, Figure 1 is a front view, partly in section, of my combined collar and hames; and Fig. 2 an enlarged sectional view on the line 1 2, Fig. 1.

A and A' represent the hames, which are hinged together at $x$, and which are connected together at the bottom by a locking device, described hereinafter. B and B' are the two portions of the collar, which are made in the form of and padded in the same manner as an ordinary horse-collar, each half forming a part of or being permanently secured to one of the portions of the hames. A padded strip, $e$, extends from one portion of the collar to the other, and is so arranged as to readily yield when the hames and collar are opened.

At the lower end of the portion A of the hames is a projection, $j$, in which is an opening for the reception of a tongue, $h$, at the lower end of the portion A' of the hames. This tongue has a notch, $f$, for the reception of a projection, $i$, on a lever, K, the latter occupying a position in a slot at the rear of the lower end of the portion A of the hames, and being hung to a pin, $m$, a spring, $n$, on the lever tending to force the same outward.

To the lower end of the lever K is hinged an arm, $p$, a projection, $q$, on which is held by a spring-catch, $t$, and from the latter projects a bent plate, $w$, on pressing which the spring-catch is moved back, the arm $p$ released, and the lever K thrown outward by the spring $n$, the projection $i$ being thereby withdrawn from the notch in the tongue $h$, and the two portions of the hames being consequently disconnected from each other, so that they can be opened and readily placed over the horse's neck, after which the lower ends of the two portions of the hames are locked together in a manner which will be readily understood without further explanation.

The hames are provided with the usual appliances for receiving the traces and other portions of the harness.

It will be seen that by the use of my combined collar and hames the tedious manipulation required in adjusting these parts of harness as ordinarily constructed is obviated.

I claim as my invention and desire to secure by Letters Patent—

The hames A A', combined with and forming part of the collar B B', when the said hames are hinged together at the top and connected together at the bottom by the device herein described or the equivalent to the same, for the purpose specified.

In testimony whereof I have signed my name to this specification in the presence of two subscribing witnesses.

MARTIN KILLACKY.

Witnesses:
JOHN WHITE,
W. J. R. DELANY.